(12) United States Patent
Slatter

(10) Patent No.: US 7,248,294 B2
(45) Date of Patent: Jul. 24, 2007

(54) INTELLIGENT FEATURE SELECTION AND PAN ZOOM CONTROL

(75) Inventor: David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1124 days.

(21) Appl. No.: 10/188,993

(22) Filed: Jul. 5, 2002

(65) Prior Publication Data

US 2003/0025812 A1 Feb. 6, 2003

(30) Foreign Application Priority Data

Jul. 10, 2001 (GB) ................. 0116877.2

(51) Int. Cl.
*H04N 5/262* (2006.01)
(52) U.S. Cl. ............................... 348/240.99
(58) Field of Classification Search ............ 348/240.99
See application file for complete search history.

(56) References Cited

U.S. PATENT DOCUMENTS

| | | | |
|---|---|---|---|
| 5,515,099 A * | 5/1996 | Cortjens et al. ............ 348/14.1 |
| 5,812,193 A | 9/1998 | Tomitaka et al. ............ 348/369 |
| 6,084,989 A | 7/2000 | Eppler ........................ 382/293 |
| 6,476,868 B1 * | 11/2002 | Kaji et al. ............. 348/333.12 |
| 6,809,759 B1 * | 10/2004 | Chiang .................... 348/211.2 |
| 6,906,746 B2 * | 6/2005 | Hijishiri et al. .......... 348/240.2 |
| 2002/0076106 A1 | 6/2002 | Kondo et al. |

FOREIGN PATENT DOCUMENTS

| | | |
|---|---|---|
| EP | 0 816 983 | 1/1998 |
| EP | 1 096 799 | 5/2001 |
| JP | 3-103248 | 4/1991 |
| JP | 3-236094 | 10/1991 |
| JP | 4-096739 | 3/1992 |

OTHER PUBLICATIONS

U.S. Appl. No. 10/078,818, filed Feb. 19, 2002, David Grosvenor et al.

* cited by examiner

*Primary Examiner*—Tuan Ho

(57) ABSTRACT

A method of automatically selecting regions of interest within an image in response to a selection signal, and panning across an image so as to keep the selected region in view is disclosed, together with an image processing system employing the method.

32 Claims, 4 Drawing Sheets

INTELLIGENT FEATURE SELECTION AND PAN ZOOM CONTROL

Figure 1:
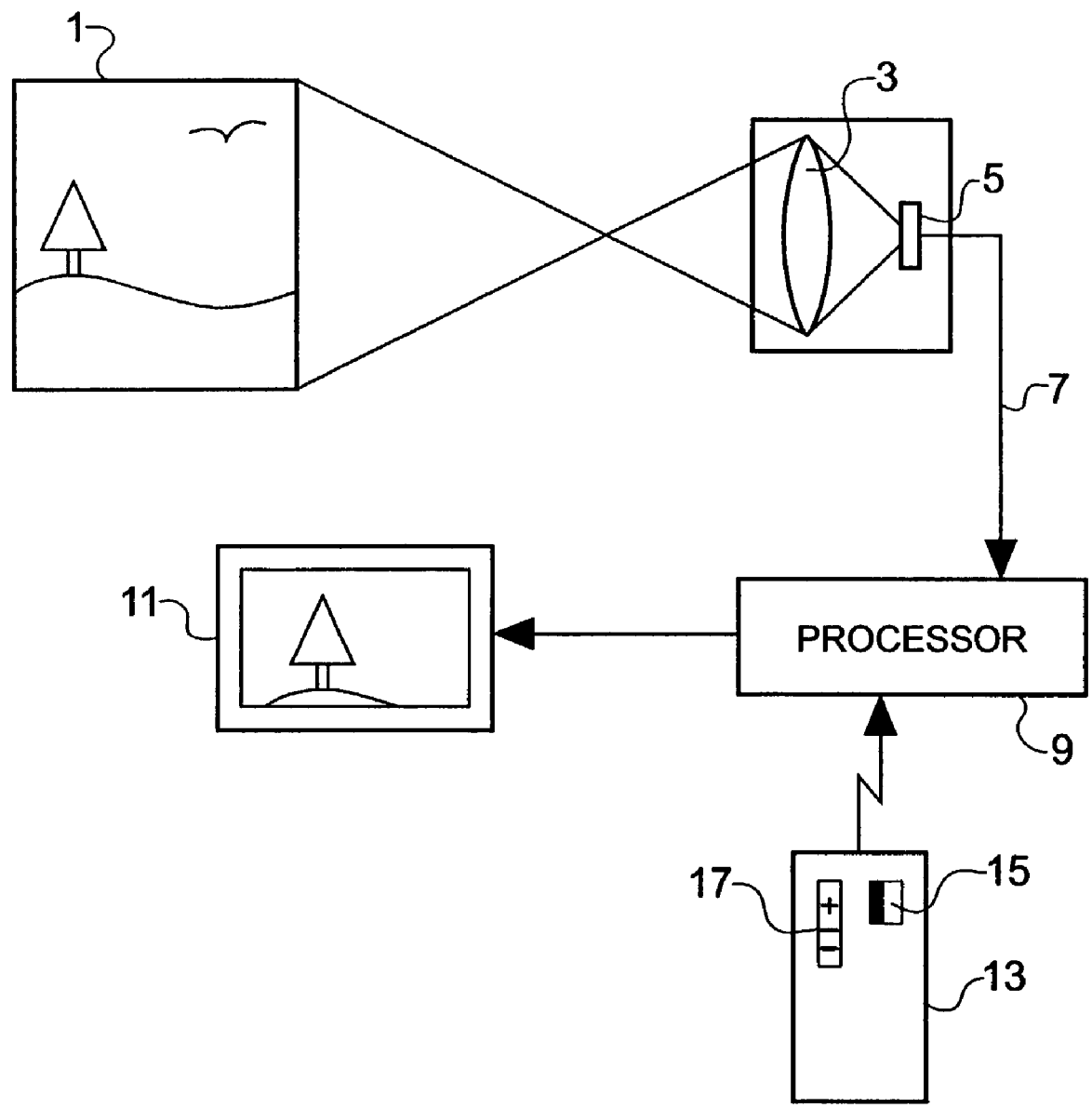

The present invention relates to a method of and apparatus for the automatic or semi-automatic selection of areas of interest within an image and the zooming in and zooming out of those areas of interest. The present invention also controls panning within an image to ensure that a selected area of interest remains displayed. The present invention also relates to an electronic image processing device, and in particular an electronic camera, having the aforementioned zoom facilities.

It is now common for digital still cameras to have the capability of capturing many more pixels in a single image than can be shown on commonly used display devices, such as the display provided as part of a camera, broadcast television receivers or most computer monitors. Consequently to see picture details it may be necessary to select only part of the image for display. This can conveniently be achieved by zooming into a selected region of the image.

This zoom function may be used when viewing a captured image on a dedicated viewing system, for example the viewing of previously captured images stored on a computer disk, CD or DVD, on a computer monitor or television screen, when it is simply required to more closely examine a particular area of the image. Zoom may also be used when further image manipulation is required after the original image has been captured, for example when it is required to alter a particular area of an image to remove an identified defect or unrequired feature from the image. Such post capture manipulation is analogous to the "touching up" process employed during the developing and printing of photographic film. Additionally, as use of electronic cameras and video cameras increases, there is an increasing need and desire to be able to view and manipulate the captured image directly on the view finder associated with the camera or video camera.

It is a known technique on electronic image viewing systems to allow the user to zoom in on, or to enlarge, a particular area of the overall image. The area to be zoomed in on is normally selected by the use of a cursor control device, such as a computer mouse or "tracker ball" in a computer based viewing system, or alternatively by the use of cursor control buttons mounted, for example on an electronic camera, or on the actual viewing device itself, for example, on a television set or television remote control unit. One disadvantage of such systems is that it is difficult for a user to move from one selected area of interest on which they have zoomed in on to another area of interest because to do so requires redisplaying the entire image, or sufficient of the image, to be able to identify the further area of interest to re-zoom in on. This can be both irritating and time consuming to the user. A further disadvantage particularly associated with viewing devices such as televisions or the view finders of electronic cameras and video cameras that do not normally display a cursor or have cursor control devices is that it is difficult to provide such cursor control functions in a manner that is both easy to use and to implement. For example, although such cursor control functions may be operated by X, Y position buttons provided on a still or motion video camera, the use of such buttons may be difficult due to the limited space available on such video cameras, and may be particularly difficult in the situation where the only display is the view finder, thus requiring the camera to be held to the eye while the X, Y buttons are operated.

It is known that a previously captured still image can be imaged again by a video camera, to produce a video sequence which can include a combination of pans across an image and zooms into and out of details. An example where this technique can usefully be used is in the viewing of a group photograph. The individual faces in such a photograph/image are usually too small to see in detail. However, by using a combination of panning and zooming a video sequence can be produced where each individual face can be clearly seen in sequence.

With electronic image processing it is, of course, not necessary to use a video camera. The required video frames can be selected, magnified and composed from the stored electronic digital representation of the original image.

Ways of automatically producing video sequences from a still are described in co-pending application "Automatic Rostrum Camera" GB 0104589.7 filed on Feb. 23, 2001. However, in the present invention, the video sequence is consumed (or watched) as it is produced and changes immediately or rapidly in response to user instructions entered via a user interface.

U.S. Pat. No. 5,812,193 discloses a video camera system which can implement both tracking and zooming in relation to an object targeted by the camera. A user can "teach" the camera by presenting the camera with a view of an object and the camera then seeks to control a tracking motor so as to keep the object in view and a zoom motor such that the size of the object with respect to the overall image remains fixed at that learnt by the camera. In a further embodiment a model of a person's head is provided such that the camera can correctly identify a head within it's field of view. Thus the device seeks to maintain a lock on a target but does so in a mechanistic sense and is unable to resolve issues raised by multiple targets or aesthetic consideration.

EP 0816983 discloses a gaze tracking system which is coupled to a computer such that the computer can tell which one of a plurality of windows or portions of an image displayed on a display device a user is looking at. If the window contains an application, then the application may be apportioned more of the computer resource. If the user is gazing at an image, then the computer may seek to display associated information or to expand the portion of the image being gazed at.

EP 1096799 discloses a camera system which compares images captured at different points in time in order to detect motion of an object within the field of view. The camera then tracks the moving object and also control zoom so as to keep the object at an appropriate size within the image. Thus this system cannot identify items of interest from analysing of a single image.

U.S. Pat. No. 6,084,989 is an image analysis system for improving the registration of a plurality of satellite images. Landmarks in images are located and compared against a library of landmark images such that the precise position of the imaging system can be determined.

Many of the devices on which it is desirable to be able to view electronic images have little or no functionality to allow the user to accurately select points or areas of interest with an image. Furthermore it is usually advantageous to reduce the user effort required to accomplish imaging operations regardless of the functionality supplied.

There is therefore a need to provide a method and apparatus that allows the easy selection of different areas of interest within an image and to easily zoom in or out of such selected areas.

According to a first aspect of the present invention there is provided an electronic image processing device including an image processor arranged to analyse an image to identify a plurality of regions of interest within the image, and in which the image processor presents the results of its analysis to a user such that a user can operate an image selector to select one of the regions of interest as a zoom target.

Preferably the image processor automatically generates crop boundaries for each region of interest.

It is thus possible to provide an image processing device which analyses an image to select salient features within an image, and having identified such features calculates crop boundaries for the features, enables automatic panning, as the user zooms in on the image, or allows a user to zoom directly to the crop boundary.

The image processor may search for non-overlapping areas of interest within an image. Since the image processor knows nothing of the image content the various regions of interest may or may not be parts of a single object.

The image processor may then search through the identified non-overlapping areas of interest to check if any areas can or should be grouped together. Thus areas which are in close proximity, ie spaced apart by less than a threshold distance, may be grouped together. Similarly areas of interest having similar properties such as, for example, colour, brightness or shape, may also be grouped together.

Preferably the image processor is arranged to present only a limited number of areas of interest to the user. Thus, for example, the algorithm used by the image processor may be selected to return less than N regions of interest, where N is an integer, and is advantageously user selectable. Typically N will be less then ten.

Presenting only a limited number of regions of interest is advantageous since it prevents the user from being presented with an overwhelming number of choices at any one time.

Advantageously the target crop boundary represents a view of the original image in which the region of interest is wholly contained with the view, but most of the rest of the original image is excluded.

Preferably the user can zoom into or jump to the view defined by the target crop boundary.

Preferably for any view currently displayed, the user can instruct the image processor to re-analyse the view to identify regions of interest therein. Thus the system can present a hierarchical series of views.

The re-application of the analysis step may be triggered by a user input, or by seeking to zoom further into the image than the view defined by the target crop boundary.

Preferably, having analysed the image, the processor may cause regions of interest to be highlighted, for example by placing a marker on or around them, or by changing their brightness in relation to the rest of the image.

The user may select one of these areas as a view. The user may then select to jump immediately to view that region of interest with a level of zoom selected automatically by the image processor, ie to jump immediately to the target crop boundary. Alternatively, the user may use a zoom control so that the user can zoom in or out as desired to the region of interest.

Preferably, where the user zooms in or out under user control, the image processor automatically pans the image as the level of zoom changes.

Advantageously the image processor identifies areas of interest that are neighbours of the user selected area of interest or which are similar to the area of interest and, for the given or current level of zoom, calculates where the centre point of the displayed image should be in order to include as many of the areas of interest as possible with the displayed image. Thus, in addition to displaying views of the selected region of interest views of composite regions of interest may be defined by incrementally adding the nearest region of interest to the current set of regions of interest and then calculating the view, ie the pan and zoom requirements from the original image, to contain them. Thus a set of views can be defined starting with one that contains just the target region originally selected by the user. The next view includes the target region and its nearest neighbour. Further views can be defined. The penultimate view will include all the regions of interest and the final view is the original image.

Thus operating the zoom control results in a panning and scaling operation that shows each of the views in turn.

Preferably the processing device includes at least one region for receiving a storage medium from which images may be retrieved and/or written. Thus semiconductor memory, magnetic and/or optical storage technologies may be used as stores for images.

According to a second aspect of the present invention, there is provided an electronic device for displaying digital images, comprising an image processor, a user operable input device for identifying a zoom target and a user operable zoom control, wherein the image processor automatically analyses an image to identify at least one region of interest, and wherein the results of the analysis are presented to a user such that he user can select one region of interest as a zoom target and control via the zoom control the level of zoom.

According to a third aspect of the present invention there is provided a method of displaying an electronic image, the method comprising the steps of analysing an image to select a plurality of regions of interest within the image, and in which the results of the analysis are presented to a user such that the user can select one of the regions of interest as a zoom target which remains displayed irrespective of a user selected zoom.

Preferably a plurality of regions of interest are identified for each image.

Each view will typically have the centre of the region of interest presented at the centre of the view.

The image processor of the electronic image processing device may evaluate a level of interest for each region of interest and assign a rating to each region of interest indicative of the level of interest. The images may then be displayed sequentially according to the assigned interest rating.

Additionally or alternatively the image processor may assign an importance rating to each of the regions of interest. This may, for example, be based on an analysis of the subject matter in that area. Thus, for example, faces may be regarded as important. The image selector may then be used to cause the views of the regions of interest to be displayed in rank according to the assigned importance rating.

According to a fourth aspect of the present invention, there is provided a method of displaying an electronic image, the method comprising the steps of automatically analysing an image to identify at least one region of interest and an associated crop boundary and wherein the results of the analysis are presented to a user such that the user can select one region of interest as the zoom target and control via a zoom control a level of zoom.

According to a fifth aspect of the present invention there is further provided an electronic camera system for capturing an electronic image comprising an electronic image processing device as described above and a display responsive the image processing device.

In one mode of operation, an advantage of the present invention is that by automatically identifying the areas of interest the user may simply sequentially select each of the identified areas of interest in turn without being required to zoom back out to the full size of the image to manually select the next area of interest. Furthermore, the present invention provides the advantage that for each area of interest a number of zoom positions may be sequentially selected.

In an alternative mode of operation the user can select one of the automatically identified areas of interest, or indeed an arbitrary point, as a target zoom point, and then zoom in or out manually. As the level of zoom varies the data processor automatically pans the image so as correctly position the features of interest viewable at that level of zoom within the display.

An embodiment of the present invention will now be described, by way of example, with reference to the accompanying drawings, in which:

FIG. 1 schematically illustrates an image processing and viewing system constituting to an embodiment of the present invention.

Figure 2:
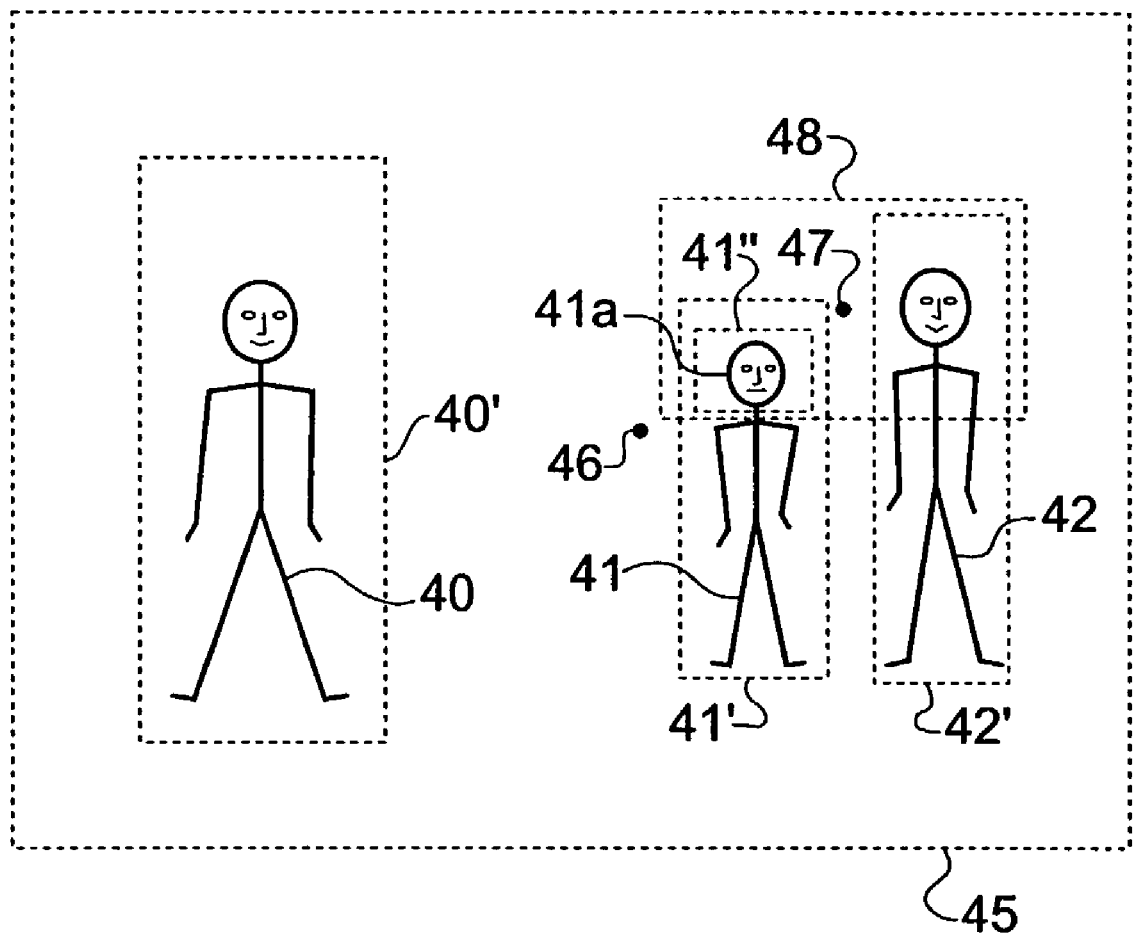
Figure 3A:
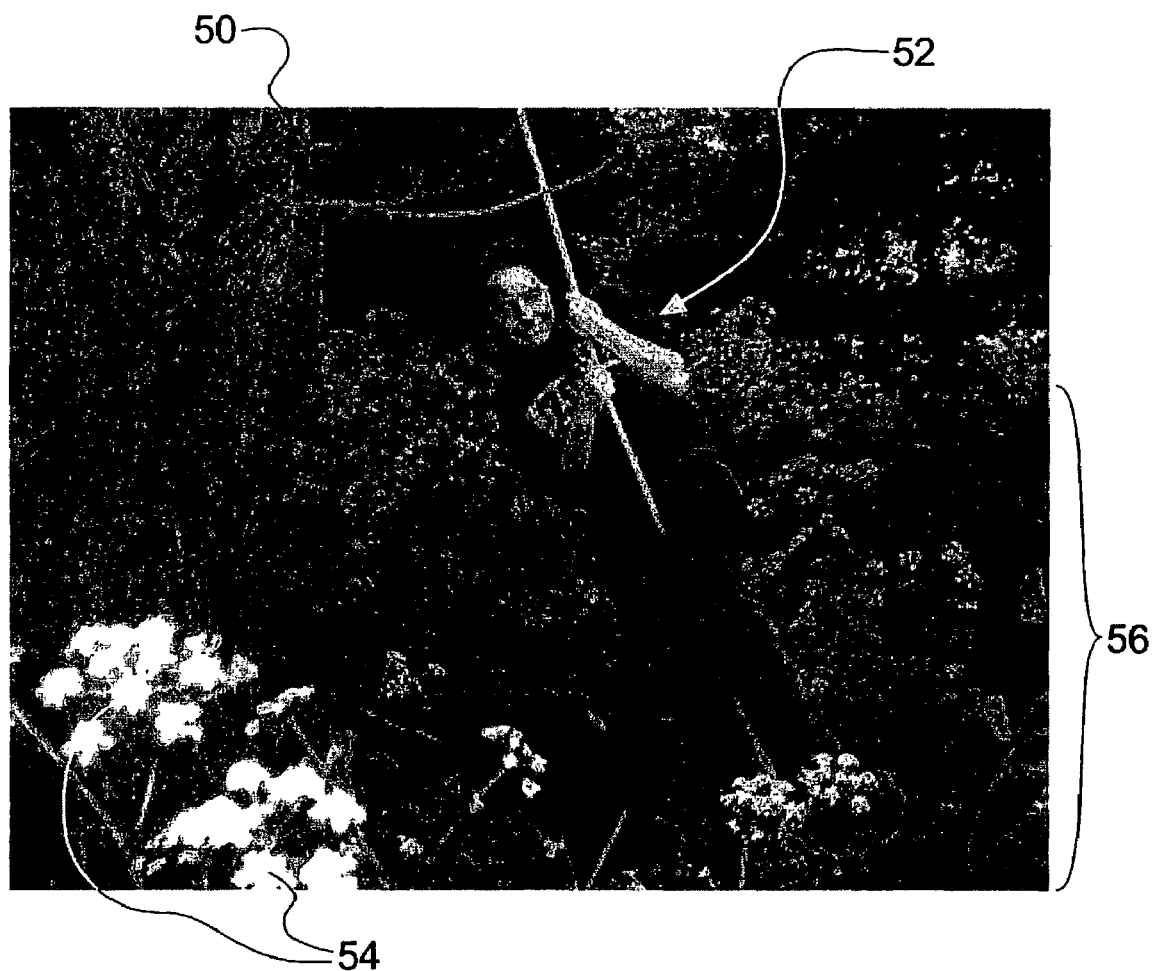
Figure 3B:
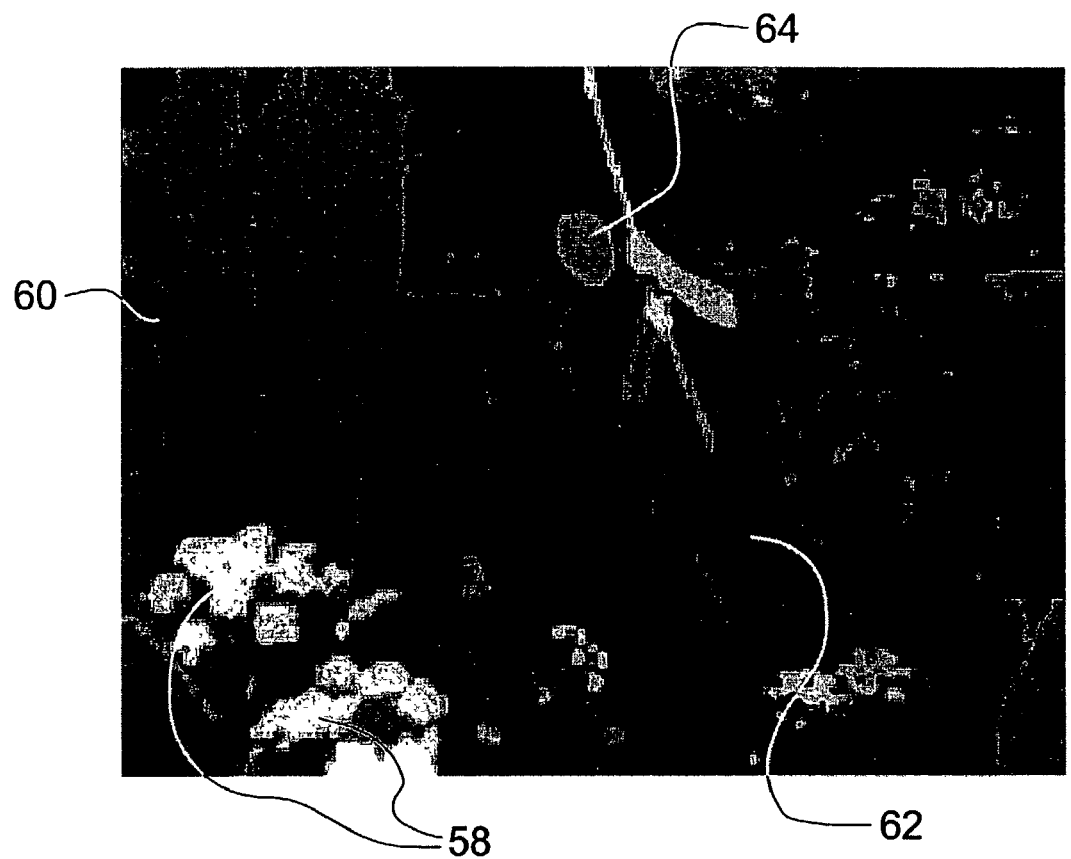
Figure 3C:

FIG. 2 is a schematic representation of an image having a multiple non-overlapping points of interest; and FIGS. 3a to 3c are illustrations showing how an image may be analysed to identify areas of interest therein;

FIG. 1 shows an electronic image capture system incorporating an image processor according to an embodiment of the present invention. A scene 1 to be captured is focussed by an optical lens system 3 onto a two-dimensional photodetector array 5. The detector array converts the image falling thereon into an electronic signal 7 that is passed to an image processor 9. The image processor is connected to a display apparatus 11 on which the captured image of scene 1, or part of the image, may be displayed. Also connected to the image processor 9 is an image selector 13. The image selector has two buttons operable by the user to select views of areas or regions of interest within the main image. The region of interest selection button 15 provides a signal to the processor 9 and, in response to this signal, the processor displays separately identified regions of interest in a sequential manner in response to subsequent signals received from the image selector 13. This may, for example, be by highlighting the regions or placing a box around them. Additionally, a zoom in/zoom out control 17 is provided on the image selector 13 which provides a further signal to the image processor 9 that acts to instruct the view to zoom in or out. The zoom is most likely to be smooth and slow, although monotonically changing rates of zoom may also be provided for. As a further alternative, the zoom may cause an immediate jump to the view defined by the target crop boundary. The image selector shown in FIG. 1 is wirelessly connected to the image processor 9. The wireless connection may be infrared, radio or any other known wireless communication schemes. Alternatively, the image selector 13 may simply be connected by a cable to the image processor 9. Further, the image selector may in fact be an integral part of the image processor 9.

FIG. 2 schematically shows a possible image that may be captured by the image capture system of FIG. 1 and schematically illustrates how areas of interest may be selected. The entire image 45 comprises three main figures, namely a person 40, a person 41 and a further person 42. The image processor may, after analysis of the image, identify the first person 40 as a region of interest and calculate an associated target zoom boundary 40'. Similarly the people 41 and 42 may also be identified as regions of interest and associated target zoom boundaries 41' and 42' calculated as shown.

Hence, when a signal is received from the image selector 13, the data processor may cyclically cause cropped regions 40', 41' and 42' to be displayed. The order of display may advantageously be determined by a level of interest metric which is implemented by the image processor to assess the regions of interest and to present them in order, with the most interesting first.

Once a user has zoomed into an image, whether partially or all the way to the crop boundaries, the user may instruct the data processor to re-analyse the image, as currently displayed, to locate new regions of interest. Thus, a hierarchy of regions of interest can be built up with second level regions of interest contained within first level regions of interest, third level regions within second level regions and so on.

The same image processing operations need not be performed at each level in the hierarchy. Thus, views at the second (or other) level may have the crop boundary calculated in accordance with predetermined rules of image composition. An example of one well known rule is the "rule of thirds"

Supposing that, following a subsequent step of analysis of this image the user selects the target zoom point to correspond to the face of the person 41 which was identified as a region of interest within. It is thus self evident that, at the maximum zoom, the zoom point will be centred approximately on the nose of the face and crop boundary 41" is an appropriate target crop. However this zoom point is not appropriate for all levels of zoom during the transition between a low zoom state, in which the image is shown in its entirety, and the fully zoomed state in which only the face 41a of person 41 is shown. In the transition from the unzoomed to the fully zoomed image, it would be appropriate to pan across the image in order to include as many regions of interest within the displayed image as reasonably possible for any given state of zoom. Thus, in one state of zoom the border of the displayed image may be represented by the chain line 45 and the centre of the image corresponds to the point labelled 46. Thus in this condition all three figures can be seen. As the level of zoom increases, it no longer becomes feasible to maintain the first person in the image, but the data processor can identify that regions of interest 41 and 42 are near neighbours. Thus, as the level of zoom increases the data processor pans across the image to move the central point of the display from position 46 to position 47 when the displayed area is bounded by the chain line 48. Thus, it is evident, that in order to maintain an appropriate level of interest in the image it has been necessary to pan across the image as the level of zoom changes. As the level of zoom increases further, it follows that only the target area of interest, namely the head 41a, can be contained within the area displayed and consequently the data processor must pan across the image again to move the centre of the image from point 47 to a new point roughly coincident with the centre of the face 41a.

At any stage of zoom, the image selector 13 (FIG. 1) may be operated to select a new region of interest. However, the choice of regions of interest is advantageously restricted to only those regions which are currently within the area of the image being displayed on the display device. This prevents the user inadvertently jumping to a new area of interest somewhere else in the image which they can no longer see due to the level of zoom.

Embodiments of the present invention therefore allows a user to move between different areas of interest within an image without redisplaying the entire image each time a different area of interest is to be selected and without requiring the user to operate any cursor control buttons to select an area of interest.

Various schemes are known for selecting an area of interest from an electronically captured image. One such known scheme is described in the present applicants co-pending UK patent application number 0031423.7 entitled "automatic cropping of electronic images". A summary of the scheme disclosed in GB0031423.7 will now be described for the sake of completeness.

FIG. 3a shows an electronic image 50 that shows a girl 52 on a swing, in approximately the centre of the image. There is also an area to the bottom left of the image in which some flowers 54 are prominent in the foreground. Additionally, part of a small boy and an adult's arm can be seen at the right hand edge 56 of the image. It will be appreciated that although only shown using a greyscale image to aid reproduction, the original image was in colour.

Firstly, the image 50 is processed in such a way that areas of similar colour, intensity and texture are merged into areas having a uniform colour and intensity. This can be seen with reference to FIG. 3b. The main parts of the flowers 54 have been merged to areas of uniform colour 58, as have the girl's face 64 and trousers 62. Large areas of the background have also been merged into areas of uniform colour, for example the tree 60 on the left hand side of the image. The techniques for merging the areas of similar colour are well known. For example, the image may be converted into a format having a compressed colour variation and then adjacent areas of similar colour or intensity may then be merged. Similarly, small areas surrounded by larger areas of similar colour or intensity may also be merged into the larger area.

The resultant image is then further processed by comparing adjacent parts of the image with each other and assigning an 'interest rating' to each part of the image indicative of the difference in colour and intensity between adjacent parts of the image or difference in colour from that occupy the largest area in the image. Using the 'interest ratings' a final image, referred to as the saliency image, is generated in which the brightness of an area of the image is proportional to the difference in averaged colour and intensity of adjacent areas. The saliency image for the image picture of FIG. 3a is shown in FIG. 3c. It can be seen that the girl 52 and flowers 54 are significantly brighter than other areas of the image.

It is the bright areas of the saliency image that are denoted areas of interest. It is these areas of interest that are highlighted in response to the appropriate signals from the image selector 13 shown in FIG. 1.

It can also be seen that the girl's jumper, legs, arms and head have all been given different colours in the saliency map. Thus each of these has been identified as a separate area of interest. However, analysis to identify and group nearest neighbours causes the girl to be identified as a single object.

Having identified areas of interest and assigned interest ratings to individual areas of the image various compositional rules may be applied to determine suitable cropped regions within the image. For example, an area of high interest located at the very edge of the main image may be interpreted as an incomplete picture element and would therefore be excluded from a cropped region.

Other known methods of selecting areas of interest from an electronic image or methods of determining regions within a main image may equally be applied to embodiments of the present invention.

The invention claimed is:

1. An electronic image processing device including an image processor arranged to analyse an image to identify a plurality of regions of interest within the image, and in which the image processor presents the results of its analysis to a user such that a user can operate an image selector to select one of the regions of interest as a zoom target, wherein the image processor compares the regions of interest to determine if individual regions of interest can be grouped together to form a composite region of interest.

2. An electronic image processing device as claimed in claim 1 further comprising a zoom control allowing the user to zoom towards or away from the zoom target.

3. An electronic image processing device as claimed in claim 1, in which the image processor identifies non-overlapping regions of interest within the image.

4. An electronic image processing device as claimed in claim 1, where the image processor is further arranged to calculate crop boundaries for the regions of interest, and where each crop conforms to at least one rule of image composition.

5. An electronic image processing device as claimed in claim 1 wherein, for any view of the image, analysis of the image can be invoked by the user to cause the image processor to identifly further regions of interest.

6. An electronic image processing device as claimed in claim 1, wherein said image processor assigns an interest rating to the or each region of interest.

7. An electronic image processing device according to claim 6, wherein said regions of interest are selected for display according to said interest rating.

8. An electronic image processing device as claimed in claim 1, wherein said image processor calculates a cropped view for the regions of interest and assigns a quality rating to each of said cropped views.

9. An electronic image processing device according to claim 8, wherein in response to said image selector said image processor sequentially selects said views according to said quality ratings.

10. An electronic image processing device as claimed in claim 1, wherein the image processor is responsive to a user operated zoom control, and as a zoom is varied, the image processor automatically pans over the image to maintain the selected region of interest within the portion of the image displayed on the display.

11. An electronic image processing system as claimed in claim 1, wherein said image selector is wirelessly coupled to said image processor.

12. An electronic camera system for capturing an electronic image
comprising an electronic image processing device as claimed in claim 1 and a display responsive to the image processing device.

13. An electronic image processing device including an image processor arranged to analyse an image to identify a plurality of regions of interest within the image, and in which the image processor presents the results of its analysis to a user such that a user can operate an image selector to select one of the regions of interest as a zoom target wherein for a user selected level of zoom the image processor searches for neighbours of the selected regions of interest, and if such regions exist, pans across the image so as to optimise the number of regions of interest displayed for a given amount of zoom.

14. An electronic image processing device as claimed in claim 13, in which the number of whole regions of interest that can be displayed is maximised.

15. An electronic image processing device as claimed in claim 14, in which the image processor seeks to minimise the number of partially displayed regions of interest.

16. An electronic device for displaying digital images, comprising an image processor, a user operable input device for identifying a zoom target and a user operable zoom control, wherein the image processor automatically analyses an image to identify at least one region of interest, and wherein the results of the analysis are presented to a user such that he user can select one region of interest as a zoom target and control via the zoom control the level of zoom, wherein the image processor compares the regions of interest to determine if individual regions of interest can be grouped together to form a composite region of interest.

17. An electronic device as claimed in claim 16, in which the image processor automatically pans the displayed image so as to keep the zoom target displayed as the level of zoom is varied.

18. An electronic device as claimed in claim 17 in which the image is pans smoothly as the zoom changes.

19. An electronic device as claimed in claim 16, in which the electronic image is a single still image.

20. An electronic device as claimed in claim 19, in which the image processor automatically calculates a crop boundary associated with each region of interest.

21. An electronic device for displaying digital images, comprising an image processor, a user operable input device for identifying a zoom target and a user operable zoom control, wherein the image processor automatically analyses an image to identify at least one region of interest, and wherein the results of the analysis are presented to a user such that he user can select one region of interest as a zoom target and control via the zoom control the level of zoom, wherein the image processor automatically pans the displayed image so as to keep the zoom target displayed as the level of zoom is varied, and in which the image processor searches for regions of interest other than the selected regions of interest and seeks to include these in the displayed image.

22. A method of displaying an electronic image, the method comprising the steps of analysing an image to select a plurality of regions of interest within the image and in which the results of the analysis are presented to a user such that the user can select one of the regions of interest as a zoom target which remains displayed irrespective of a user selected zoom wherein the image processor compares the regions of interest to determine if individual regions of interest can be grouped together to form a composite region of interest.

23. A method as claimed in claim 22, in which a crop boundary is calculated for each region of interest and the user can vary the zoom between no zoom and a level limited by the entirety of the image within the crop boundary being displayed.

24. A method as claimed in claim 22, in which the level of zoom is user controllable.

25. A method as claimed in claim 22, in which the image processor identifies non-overlapping regions of interest within the image.

26. A method as claimed in claim 22, where the target crop conforms to at least one rule of image composition.

27. A method as claimed in claim 22 wherein, for any view of the image, analysis of the image can be invoked by the user to cause the image processor to identify further regions of interest.

28. A method as claimed in claim 22, further comprising the step of evaluating a level of interest of each region of interest and assigning a rating to each region of interest indicative of said level of interest.

29. A method as claimed in claim 22, in which for any given level of zoom, the image processor pans across the image such that the number of whole regions of interest displayed is maximised.

30. A method of displaying an electronic image, the method comprising the steps of analysing an image to select a plurality of regions of interest within the image and in which the results of the analysis are presented to a user such that the user can select one of the regions of interest as a zoom target which remains displayed irrespective of a user selected zoom; further comprising the step of evaluating a level of interest of each region of interest and assigning a rating to each region of interest indicative of said level of interest, wherein said regions are sequentially displayed in order of said assigned rating in response to said region of interest selection signal.

31. A method of displaying an electronic image, the method comprising the steps of automatically analysing an image to identify at least one region of interest and an associated crop boundary and wherein the results of the analysis are presented to a user such that the user can select one region of interest as the zoom target and control via a zoom control a level of zoom; and searching for regions of interest other than the selected region of interest and seeking to include these in the displayed image if the level of zoom so permits.

32. A method as claimed in claim 31, in which the image is automatically panned so as to keep the zoom target displayed as the level of zoom is varied.

* * * * *